US011122022B2

(12) United States Patent
Stalzer et al.

(10) Patent No.: US 11,122,022 B2
(45) Date of Patent: *Sep. 14, 2021

(54) NETWORK CONNECTION AUTOMATION

(71) Applicant: Amazon Technologies, Inc., Seattle, WA (US)

(72) Inventors: Mark Edward Stalzer, Arlington, VA (US); Christian Arthur Arllen, McLean, VA (US)

(73) Assignee: Amazon Technologies, Inc., Seattle, WA (US)

( * ) Notice: Subject to any disclaimer, the term of this patent is extended or adjusted under 35 U.S.C. 154(b) by 270 days.

This patent is subject to a terminal disclaimer.

(21) Appl. No.: 15/632,166

(22) Filed: Jun. 23, 2017

(65) Prior Publication Data

US 2017/0295150 A1    Oct. 12, 2017

Related U.S. Application Data

(63) Continuation of application No. 14/029,496, filed on Sep. 17, 2013, now Pat. No. 9,692,732.

(51) Int. Cl.
*H04L 29/06* (2006.01)
*H04L 12/26* (2006.01)
(Continued)

(52) U.S. Cl.
CPC .......... *H04L 63/061* (2013.01); *H04L 29/06* (2013.01); *H04L 41/046* (2013.01);
(Continued)

(58) Field of Classification Search
CPC . H04L 63/061; H04L 43/0811; H04L 45/306; H04L 63/0853; H04L 29/06;
(Continued)

(56) References Cited

U.S. PATENT DOCUMENTS 5,361,062 A * 11/1994 Weiss ............... G06F 21/34
235/382
5,748,629 A    5/1998 Caldera et al.
(Continued)

FOREIGN PATENT DOCUMENTS

JP    2002108818    4/2002
JP    2004318582    11/2004
(Continued)

OTHER PUBLICATIONS

Japanese Final Office Action for Application No. 2016-542872 dated Nov. 20, 2017, 5 pages.
(Continued)

*Primary Examiner* — Ghodrat Jamshidi
(74) *Attorney, Agent, or Firm* — Davis Wright Tremaine LLP

(57) ABSTRACT

A computing resource service provider receives a request from a customer to establish a physical connection between a provider network device and a customer network device in a colocation center. Once the connection has been established, the customer may transmit cryptographic authentication information, through the physical connection, to the provider network device. The provider network device transmits this information to an authentication service operated by the computing resource service provider to verify the authenticity of the information. If the information is authentic, the authentication service may re-configure the provider network device to allow the customer to access one or more services provided by the computing resource service provider. The authentication service may transmit cryptographic authentication information to the customer to verify the identity of the computing resource service provider.

20 Claims, 11 Drawing Sheets

(51) Int. Cl.
*H04L 12/725* (2013.01)
*H04L 29/08* (2006.01)
*H04L 12/24* (2006.01)
*H04L 12/14* (2006.01)

(52) U.S. Cl.
CPC ........ *H04L 43/0811* (2013.01); *H04L 45/306* (2013.01); *H04L 63/0428* (2013.01); *H04L 63/08* (2013.01); *H04L 63/0853* (2013.01); *H04L 63/10* (2013.01); *H04L 67/14* (2013.01); *H04L 12/1435* (2013.01); *H04L 41/0896* (2013.01); *H04L 63/0272* (2013.01)

(58) Field of Classification Search
CPC ... H04L 41/046; H04L 63/0428; H04L 63/08; H04L 67/14; H04L 12/1435; H04L 41/0896; H04L 63/0272
See application file for complete search history.

(56) References Cited

U.S. PATENT DOCUMENTS

| | | | |
|---|---|---|---|
| 6,198,824 B1 | 3/2001 | Shambroom | |
| 6,311,218 B1* | 10/2001 | Jain | H04L 12/413 709/225 |
| 6,639,919 B2 | 10/2003 | Kroninger et al. | |
| 6,842,628 B1 | 1/2005 | Arnold et al. | |
| 7,039,713 B1 | 5/2006 | Van Gunter et al. | |
| 7,107,312 B2 | 9/2006 | Hackbarth et al. | |
| 7,292,577 B1 | 11/2007 | Ginipalli et al. | |
| 7,327,682 B2 | 2/2008 | Gandhi et al. | |
| 7,359,322 B2 | 4/2008 | Khurana et al. | |
| 7,453,825 B1* | 11/2008 | Sivasankaran | H04L 12/40182 370/216 |
| 7,577,154 B1 | 8/2009 | Yung et al. | |
| 7,734,516 B2 | 6/2010 | Barnum et al. | |
| 7,743,001 B1 | 6/2010 | Vermeulen et al. | |
| 7,933,230 B2 | 4/2011 | Sato | |
| 7,970,903 B2 | 6/2011 | Oeda | |
| 8,495,199 B2 | 7/2013 | Miller et al. | |
| 8,955,055 B1* | 2/2015 | Bogdanovic | H04L 63/0892 726/4 |
| 8,959,203 B1* | 2/2015 | Miller | H04L 47/00 709/224 |
| 2001/0022837 A1 | 9/2001 | Vasell et al. | |
| 2002/0009092 A1 | 1/2002 | Seaman et al. | |
| 2003/0074443 A1 | 4/2003 | Melaku et al. | |
| 2003/0236745 A1 | 12/2003 | Hartsell et al. | |
| 2004/0066769 A1 | 4/2004 | Ahmavaara et al. | |
| 2005/0063400 A1 | 3/2005 | Lum | |
| 2006/0089124 A1 | 4/2006 | Frank et al. | |
| 2007/0067424 A1 | 3/2007 | Raciborksi et al. | |
| 2007/0135109 A1 | 6/2007 | Walter et al. | |
| 2007/0226490 A1 | 9/2007 | Odaware et al. | |
| 2007/0234054 A1 | 10/2007 | Roberts et al. | |
| 2008/0276085 A1 | 11/2008 | Davidson et al. | |
| 2008/0298374 A1 | 12/2008 | Rhoades et al. | |
| 2009/0070235 A1 | 3/2009 | Mehta et al. | |
| 2009/0106551 A1 | 4/2009 | Boren et al. | |
| 2009/0112735 A1 | 4/2009 | Viehmann et al. | |
| 2009/0192945 A1 | 7/2009 | Perpina et al. | |
| 2009/0216889 A1 | 8/2009 | Hadi | |
| 2009/0276771 A1 | 11/2009 | Nickolov et al. | |
| 2009/0300635 A1 | 12/2009 | Ferris | |
| 2010/0027552 A1 | 2/2010 | Hill | |
| 2010/0039959 A1 | 2/2010 | Gilmartin | |
| 2010/0046381 A1* | 2/2010 | Bajpay | H04L 41/5009 370/244 |
| 2010/0111093 A1 | 5/2010 | Satterlee et al. | |
| 2010/0122094 A1 | 5/2010 | Shima | |
| 2010/0125664 A1 | 5/2010 | Hadar et al. | |
| 2010/0131649 A1 | 5/2010 | Ferris | |
| 2010/0131948 A1 | 5/2010 | Ferris | |
| 2010/0195540 A1 | 8/2010 | Kerr et al. | |
| 2010/0226254 A1 | 9/2010 | Kerr et al. | |
| 2010/0226280 A1 | 9/2010 | Burns et al. | |
| 2010/0280934 A1 | 11/2010 | Kerr et al. | |
| 2010/0319004 A1 | 12/2010 | Hudson et al. | |
| 2010/0332262 A1 | 12/2010 | Horvitz et al. | |
| 2011/0016028 A1 | 1/2011 | Toure et al. | |
| 2011/0066752 A1 | 3/2011 | Lippincott et al. | |
| 2011/0078311 A1 | 3/2011 | Nakashima | |
| 2011/0107090 A1 | 5/2011 | Varadarajan et al. | |
| 2011/0131335 A1 | 6/2011 | Spaltro et al. | |
| 2011/0131647 A1 | 6/2011 | Sanders et al. | |
| 2011/0154212 A1 | 6/2011 | Gharpure et al. | |
| 2011/0179162 A1 | 7/2011 | Mayo et al. | |
| 2011/0231899 A1 | 9/2011 | Pulier et al. | |
| 2011/0310892 A1 | 12/2011 | DiMambro | |
| 2012/0130873 A1 | 5/2012 | Morgan | |
| 2012/0240204 A1* | 9/2012 | Bhatnagar | G06F 21/35 726/5 |
| 2012/0291109 A1 | 11/2012 | Minamizawa | |
| 2013/0046976 A1* | 2/2013 | Rosati | H04L 63/0853 713/168 |
| 2013/0156093 A1 | 6/2013 | Vonog et al. | |
| 2013/0166709 A1 | 6/2013 | Doane et al. | |
| 2014/0068721 A1* | 3/2014 | Ong | H04L 63/107 726/4 |
| 2014/0157298 A1* | 6/2014 | Murphy | H04N 21/64322 725/14 |
| 2014/0230044 A1 | 8/2014 | Liu et al. | |
| 2015/0023207 A1* | 1/2015 | Lan | H04L 45/308 370/254 |

FOREIGN PATENT DOCUMENTS

| | | |
|---|---|---|
| JP | 2005333350 | 12/2005 |
| WO | WO2005032042 | 4/2005 |
| WO | WO2013056585 | 4/2013 |
| WO | WO2013081962 | 6/2013 |

OTHER PUBLICATIONS

Canadian Office Action for Application No. 2,923,431 dated Oct. 24, 2017, 3 pages.

Chinese First Office Action for Patent Application No. 201480050814. 4, dated Apr. 3, 2018, 36 pages.

Cisco, "Network Virtualization—Network Admission Control Deployment Guide" Cisco Systems, Inc., 2007, pp. 1-14.

International Search Report and Written Opinion dated Dec. 22, 2014, International Patent Application No. PCT/US2014/055874, filed Sep. 16, 2014.

International Search Report and Written Opinion dated Feb. 5, 2013, in International Application No. PCT/US2012/66517 filed Nov. 26, 2012.

Rekhter et al., "A Border Gateway Protocol 4 (BGP-4)," Standards Track, The Internet Engineering Task Force (IETF), Jan. 2006, The Internet Society, retrieved from the Internet: http://toold.ietf.org/pdf/rfc4271.pdf, 105 pages.

U.S. Appl. No. 13/306,801, filed Nov. 29, 2011, entitled "Interfaces to Manage Last-Mile Connectivity for Direct Network Peerings," Miller, et al., 76 pages.

U.S. Appl. No. 13/330,449, filed Dec. 19, 2011, entitled "Differential Bandwidth Metering for Networks with Direct Peerings," Furr et al., 76 pages.

U.S. Appl. No. 13/555,360, filed Jul. 23, 2012, entitled "Automated Multi-Party Cloud Connectivity Provisioning", Cullen, et al.

* cited by examiner

NETWORK CONNECTION AUTOMATION

CROSS-REFERENCE TO RELATED APPLICATIONS

This application claims priority to and is a continuation of U.S. patent application Ser. No. 14/029,496, filed on Sep. 17, 2013 and is incorporated by reference for all purposes in its entirety. This application also relates to and incorporates by reference for all purposes the full disclosure of U.S. patent application Ser. No. 13/306,775, filed on Nov. 29, 2011, entitled "INTERFACES TO MANAGE DIRECT NETWORK PEERINGS."

BACKGROUND

Computing resource service providers and other service providers often grant users access to their services through the use of dedicated network connections. Many users, for example, utilize a colocation environment to connect directly with the computing resource service provider in order to access one or more services. Despite their many advantages, creating a dedicated and secure connection between the computing resource service provider and a customer may not be free of all risks. For example, despite their best efforts to avoid it, even a physical, dedicated connection may have points of susceptibility (e.g., at patch panels) where unauthorized and/or unintentional access to communications is possible. Currently, computing resource service providers may use conventional authentication methods to ensure that the connection is secure. However, conventional authentication methods often rely on manual intervention and are inherently inflexible. Additionally, the cryptographic techniques used to secure the connection may have vulnerabilities exploitable to gain unauthorized access to the connection. Adequately addressing these risks presents additional costs to the organizations that rely on the dedicated connection and to the computing resource service provider.

BRIEF DESCRIPTION OF THE DRAWINGS

Various embodiments in accordance with the present disclosure will be described with reference to the drawings, in which.

DETAILED DESCRIPTION

Figure 1:
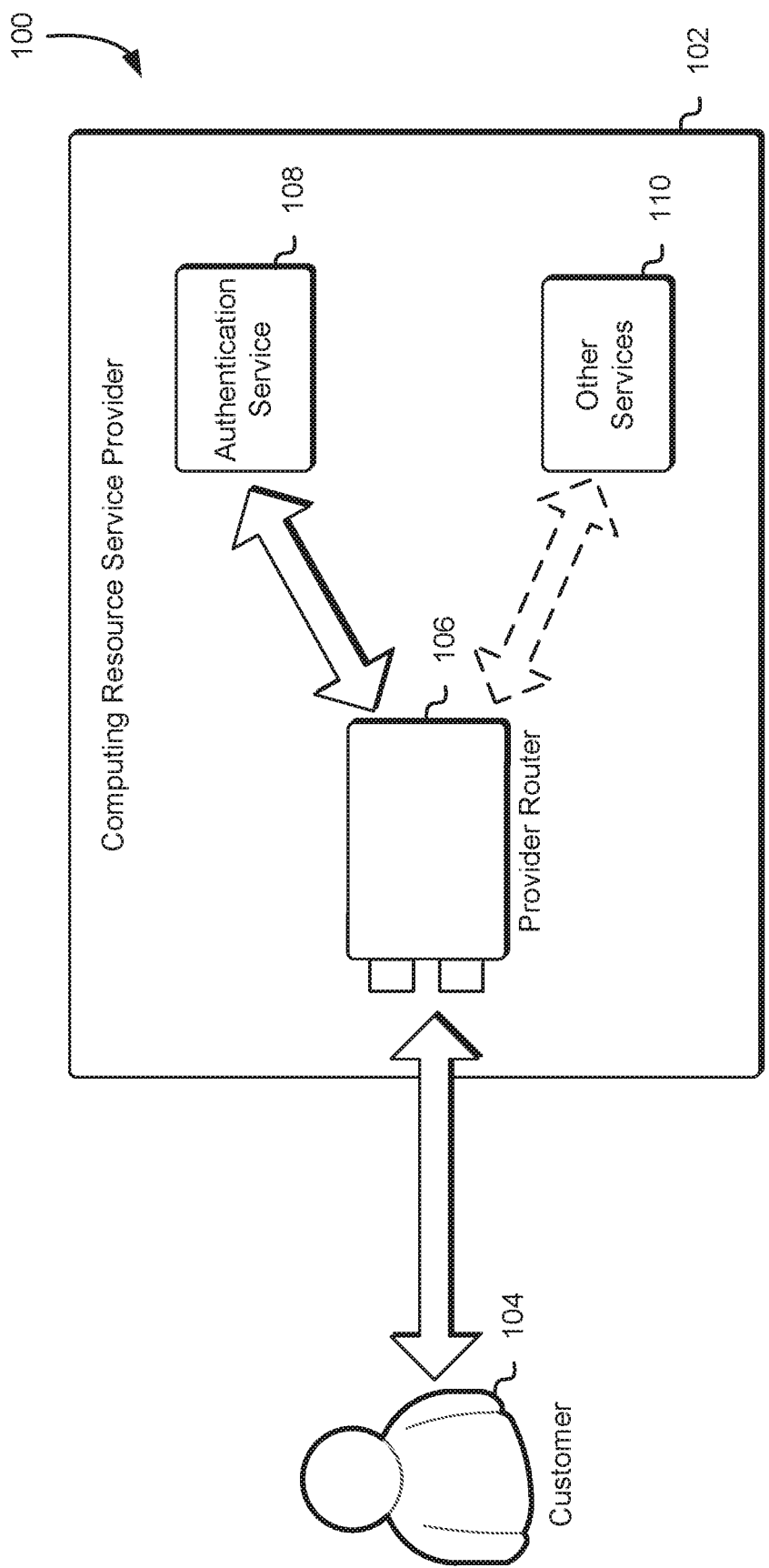
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the authentication of a connection between a customer (e.g., a network operated by the customer) and a computing resource service provider. In an embodiment, a computing resource service provider may receive a request from an entity (e.g., an organization) to establish a direct connection between the entity and the computing resource service provider. The entity may be a customer of the computing resource service provider who may operate various services, such as data storage services, virtual computing system services and/or database services. For optimal usage of one or more of the services, the computing resource service provider may allow customers to communicate with the computing resource service provider's network using direct connections, i.e. physical communications connections that connect customer computing resources to computing resource service provider computing resources. Example techniques for establishing such connections are described in U.S. patent application Ser. No. 13/306,775, filed on Nov. 29, 2011, titled "Interfaces to Manage Direct Network Peerings," which is incorporated herein by reference in its entirety for all purposes.

Prior to installation of the connection between the computing resource service provider and the customer, the computing resource service provider may generate a letter of authority in order to allow an employee of the computing resource service provider (e.g., a data technician) to connect physical routers associated with the customer and the computing resource service provider. This letter of authority may be generated in response to the received request from a customer to establish a direct connection with the computing resource service provider.

In various embodiments, the computing resource service provider may transmit one or more signals to the customer router upon connection to initiate network connectivity between the customer and the computing resource service provider. These one or more signals may additionally include an authentication request in order to verify that the connection has been established correctly and that the customer is the correct entity authorized to connect to the computing resource service provider. The customer may transmit one or more signals in response to computing resource service provider in order to verify that the customer is authorized to access the computing resource service provider computer systems. These one or more signals may include a digital signature generated using one or more authentication credentials, such as a secret cryptographic key, originating from one or more customer computer systems. This signature may be generated using a symmetric cryptographic algorithm and/or an asymmetric cryptographic algorithm. The computing resource service provider may transmit the customer signals (or information based at least in part thereon) to an authentication service in order to determine whether the signature received from the customer is authentic and corresponds to this customer. If the customer signals are not authenticated, the computing resource service provider may deny access to its various services. Otherwise, the customer may be granted access to the one or more services that the customer has opted to use.

In an embodiment, the computing resource service provider may transmit one or more authentication requests to the customer over time after the initial connection to ensure the connection has not been compromised. The customer may transmit a response to the request, which may comprise a digital signature generated using a hash function and a cryptographic key to the computing resource service provider to provide evidence that the customer is authorized to maintain the connection. Accordingly, if the signature is verified, such as through the authentication service, the computing resource service provider may allow the connection to continue. However, if the authentication service is unable to verify that the customer has the authority to access the services provided by the computing resource service provider, the computing resource service provider may limit the customer's access to the services until the customer is able to provide a valid digital signature to the computing resource service provider.

In an embodiment, the customer transmits an authentication request to the computing resource service provider, such as through an appropriately configured API call to the service, to verify that the connection is currently between the customer and the computing resource service provider. If the signal received from the computing resource service provider is not authentic (e.g., does not include a valid digital signature on behalf of the computing resource service provider), the customer may limit or even terminate the connection with the computing resource service provider. Otherwise, the customer may continue his/her access to the various services provided by the computing resource service provider provided the customer may reciprocally provide authentication credentials to the computing resource service provider when requested.

In some embodiments, the customer may transmit an authentication request to the computing resource service provider, such as through an appropriately configured API call to the service, to cause the authentication service to verify that the customer communications are truly originating from a customer computer system. This authentication request transmitted by the customer may include a digital signature which may be used by the computing resource service provider to verify the customer's identity. If the digital signature is authentic, the computing resource service provider may transmit one or more signals comprising a digital signature for the computing resource service provider to the customer. Accordingly, the customer may use this digital signature to verify the identity of the computing resource service provider.

In this manner, the computing resource service provider and its customers may be connected through one or more physical routers and ensure that the connection is limited or terminated in the event of a failure to authenticate the customer or computing resource service provider signals. In addition, the techniques described herein facilitate additional technical advantages. For example, because, in some embodiments, the authentication processes are performed by computer systems managed by either the computing resource service provider or the customer, manual intervention may not be required to authenticate the connection. Accordingly, these techniques may increase the flexibility available to the computing resource service provider and its customers in ensuring a secure connection. Additionally, the use of an alternative authentication process may eliminate the use of the conventional router-to-router authentication techniques, potentially eliminating or mitigating any vulnerability that may be inherent in the conventional techniques. Additional uses are also enabled by the various techniques described herein.

FIG. 1 shows an illustrative example of an environment 100 in which various embodiments may be practiced. In the environment 100, a computing resource service provider 102 provides various computing resource services to customers of the computing resource service provider. The computing resource service provider 102 may be an organization that hosts various computing resources on behalf of one or more customers. For example, a computing resource service provider may operate one or more facilities that are used to host various computing hardware resources, such as hardware servers, data storage devices, network devices, and other equipment, such as server racks, networking cables and the like. The computing resource hardware may utilize its computing hardware resources to operate one or more services. Such services may include services that enable customers of the computing resource service provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a web site, operating enterprise systems supporting an organization, distributed computation and/or other activities.

Accordingly, as illustrated in FIG. 1, the environment 100 includes a customer 104. The customer 104 may be an organization that utilizes some or all of the various services at least in part by establishing a direct connection with the computing resource service provider 102. The customer 104 of the computing resource service provider 102 may utilize various services provided by the computing resource service provider 102. For example, the customer 104 may utilize the services provided by the computing resource service provider 102 through automated processes, such as batch requests made to a service or customer server requests that require access to the service to support a customer operation. The customer 104 may contact the computing resource service provider 102 to request the installation of a direct connection to the computing resource service provider. The computing resource service provider may generate a letter of authority and either deploy a data technician or allow the customer 102 to use its own data technician or third party to connect a customer router and a computing resource service provider router 106. The routers may be located in a data center or colocation which, in turn, may be located in a remote location. While routers are used extensively throughout the present disclosure for the purpose of illustration, the techniques illustrated in the present disclosure may additionally apply generally to other network devices (e.g., gateway devices, etc.).

Once the connection between the customer 104 and the computing resource service provider router 106 has been established, the computing resource service provider router may initiate transmission of one or more signals to the customer router. One such signal may include an authentication request in order to verify that the customer 104 is authorized to connect to the computing resource service provider 102. This authentication request may originate in an authentication service 108, maintained and operated by the computing resource service provider 102. The authentication service 108 may be configured to obtain customer information from an account service (not shown) in order to obtain a cryptographic key which may be necessary to hash the received customer data to generate an expected customer digital signature. This expected customer digital signature may be compared to the received customer digital signature to verify the customer's identity. Additionally, the authentication service 108 may be configured to transmit executable commands to the computing resource service provider router 106 to transmit the authentication request to the customer 104.

In response to the authentication request, the customer 104 may provide one or more data packets comprising a digital signature along with additional data (e.g., customer identification number, port number, etc.) to the computing resource service provider 102 through one or more signals transmitted to the computing resource service provider router 106. Accordingly, the router 106 may transmit these data packets to the authentication service 108 for validation. The authentication service 108 may be configured to hash the additional data received from the customer 104, along with a cryptographic key to generate an expected customer digital signature. If the digital signatures match, the authentication service 108 may reconfigure the computing resource service provider router 106 to enable the customer to access one or more other services 110 provided by the computing resource service provider 102. These other services 110 may include various data storage services (object-based data storage services, archival data storage services, database services and the like), program execution services and the like. However, if the digital signature received from the customer 104 does not match the expected digital signature, the authentication service 108 may deny access to the other services 110.

Alternatively, the customer 104 may initiate the authentication process, such as through an appropriately configured API call to the service, by transmitting one or more data packets to the computing resource service provider router 106. These data packets may include a digital signature generated using a secret key which, when processed by the computing resource service provider 102, causes the service provider to hash the received data, along with a cryptographic key, to generate an expected customer digital signature which may be used to determine whether the received digital signature is authentic. Additionally, these data packets may cause the service provider 102 to generate one or more data packets comprising its own digital signature which may be used by the customer 104 to verify the identity of the computing resource service provider. In this fashion, both the customer 104 and the computing resource service provider 102 may verify the authenticity of the signals transmitted through the direct physical connection.

Once the customer 104 has attained access to the one or more other services 110, the computing resource service provider 102 may use the authentication service 108 to transmit one or more authentication requests to the customer to ensure that the connection has not been compromised. If there is an indication that the connection may have been compromised (e.g., the authentication credentials received from the customer 104 do not match the expected values), the computing resource service provider 102, through the authentication service 108, may perform one or more actions with regard to the existing connection. For instance, the computing resource service provider 102 may configure the authentication service 108 to transmit one or more executable instructions to the router 106 to limit the connection. This may include throttling the available network bandwidth to the customer 104 or disabling access to the other services 110. In another instance, the authentication service 108 may refer to the account service (not shown) to apply one or more restrictions to the connection in accordance with customer 104 specifications. For instance, the customer 104 may have specified during the initial request for a direct connection to the computing resource service provider 102 that certain actions are to be taken if the connection is compromised. The computing resource service provider 102 may restore the connection if the customer 104 at a later point provides valid authentication credentials to the computing resource service provider.

Figure 2:
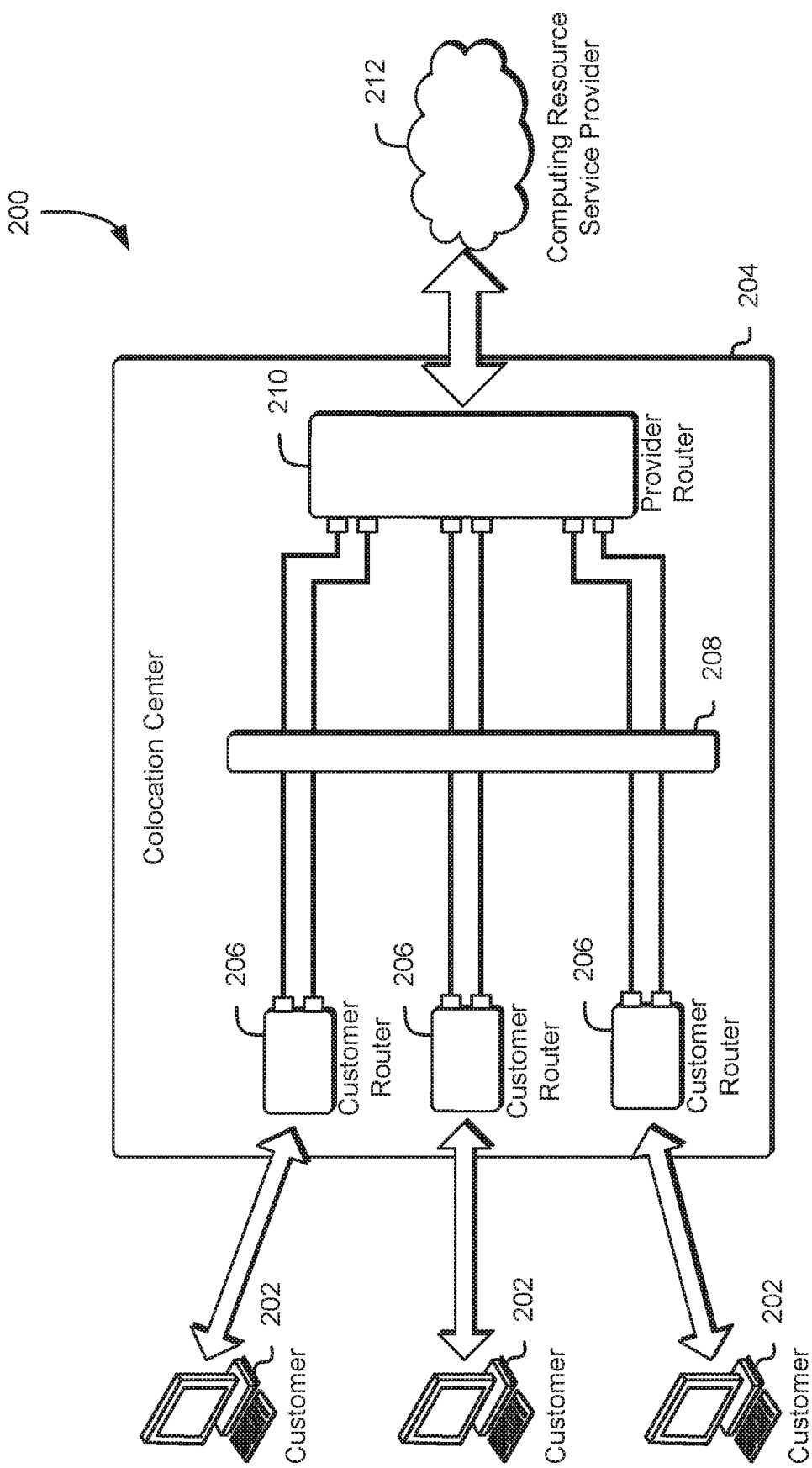
FIG. 2 shows an illustrative example of an environment in which various embodiments can be practiced.

As noted above, the physical connection between a customer router and a computing resource service provider router may be made at a data center or colocation that may be located at a remote location. Accordingly, FIG. 2 is an illustrative example of an environment in which various embodiments can be practiced. In the environment 200, direct connections may have been established between one or more customers 202 and a computing resource service provider 212. As noted above, a customer 202 may contact the computing resource service provider 212 to request the installation of a direct connection to the computing resource service provider. Accordingly, the computing resource service provider 212 may deploy a data technician to establish a physical connection between a customer router 206 and a computing resource service provider router 210. The routers 206, 210 may be located in a data center or colocation 204 which, in turn, may be located in a remote location.

In this illustrative example, the direct connection between one or more customers 202 and the computing resource service provider 212 may be established by installing cables between the customer routers 206 and a computing resource service provider router 210. The routers 206, 210 illustrated in FIG. 2 may comprise a variety of ports configured to allow users to transmit data to a recipient or receive data from a source. For instance, in embodiments where the customer and provider connect using fiber optic cables, a router 206, 210 may comprise a number of transmission ports and a number of receiving ports. Thus, the connection between a customer router 206 and the computing resource service provider router 210 may include a plurality of cables that, when connected to the routers, enable a customer 202 and the computing resource service provider 212 to transmit and receive data.

Depending on the configuration of the colocation 204, a direct physical connection (or simply "physical connection") between a customer router 206 and a computing resource service provider router 210 may include one or more patch panels 208 or other intervening structures (e.g., non-routing devices, couplers, etc.). For instance, the one or more patch panels 208 may enable a colocation 204 operator to use shorter lengths of cable to connect two or more devices, such as the customer routers 206 and the computing resource service provider router 210. Additionally, the patch panels 208 may be used to simplify the identification of the ports used to establish the connection as the input/output ports may be labeled accordingly from the patch panels 208. In other words, embodiments of the present disclosure are not limited to those in which a contiguous cable connects the customer and provider routers. Once the physical connection has been established from the customer routers 206 to the computing resource service provider router 210 in the colocation 204, the computing resource service provider 212 may begin transmitting one or more signals through the computing resource service provider router to the customer routers. The customer router 206, upon receiving the one or more signals from the computing resource service provider 212, may transmit the one or more signals to the customer 202 for processing. As noted above, the one or more signals may include an authentication request which may cause the computer systems operated by a customer 202 to transmit a response comprising authentication proof. The authentication proof may include a digital signature or other account credential necessary to establish the identity of the customer 202. While the use of digital signatures for authentication is used extensively throughout the present disclosure for the purpose of illustration, other authentication methods may be used. For instance, the authentication request sent by a computing resource service provider 212 may include executable instructions that may cause a customer graphical user interface to appear on a customer 202 computer system with a prompt for a password. Thus, a customer 202 may be required to type in a password in the prompt in order to authenticate the connection.

Once the connection has been authenticated, the computing resource service provider 212, through an authentication service, may re-configure the computing resource service provider router 210 to allow communications between a customer 202 and one or more services provided by the computing resource service provider. At a later time, the computing resource service provider 212 may transmit one or more signals through its router 210 to a customer 202 to verify that the connection has not been compromised. If the customer 202 is unable to provide adequate authentication proof (e.g., invalid credential, invalid digital signature, incorrect Internet protocol (IP) address, checksum mismatch, etc.) to the computing resource service provider 212, the computing resource service provider, through the authentication service, may once again re-configure the computing resource service provider router 210 to limit the customer's 202 access to the one or more services.

At the same time, the customer 202 may transmit, through the customer router 206 one or more signals to the computing resource service provider 212 to verify that the connection has not been compromised. If the computing resource service provider 212 is unable to provide adequate authentication proof, the customer 202, through one or more computer systems operated by the customer, may transmit an executable command to the customer router 206 to limit or even terminate the existing connection.

Figure 3:
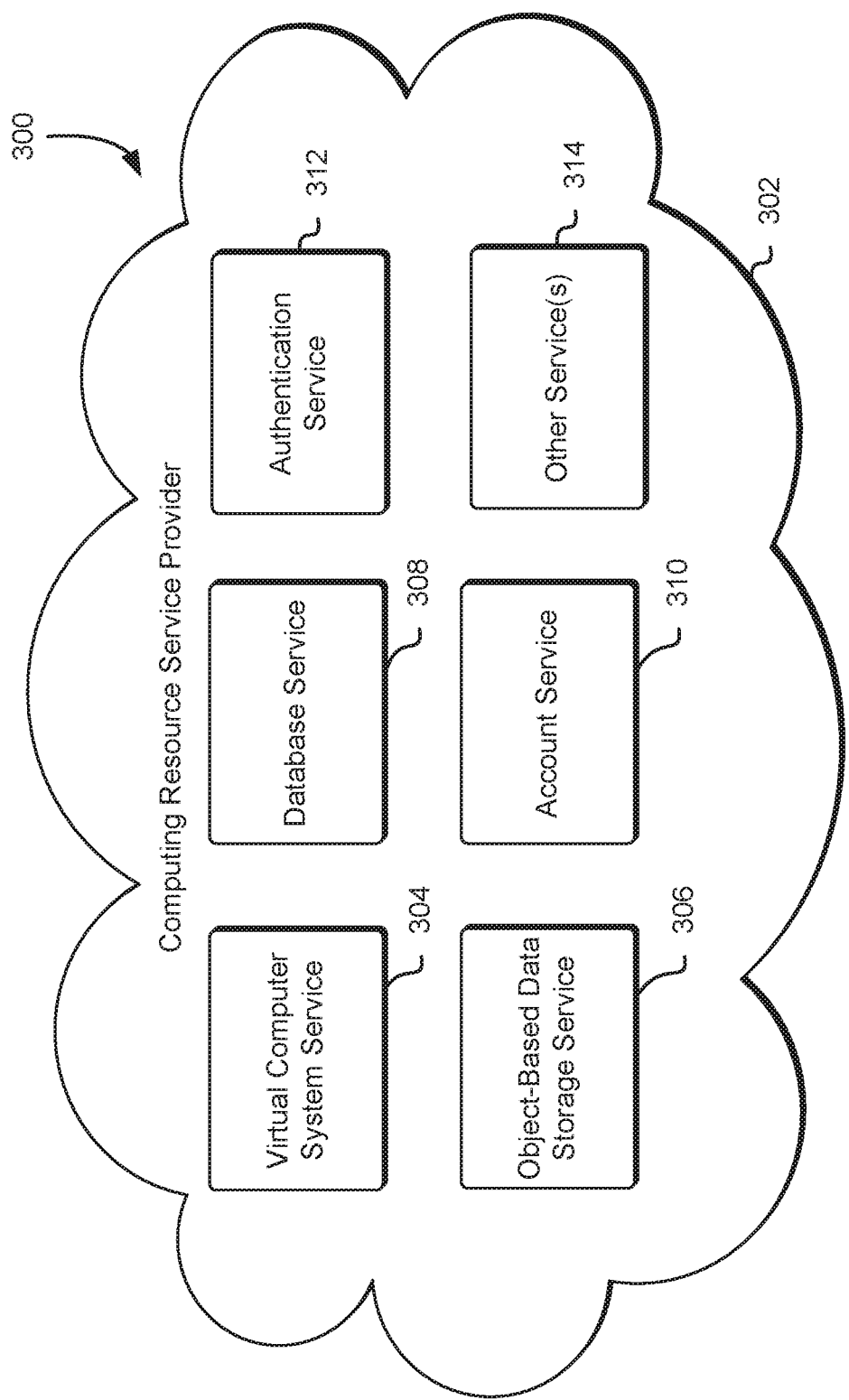
FIG. 3 shows an illustrative example of one or more services provided by a computing resource service provider in accordance with at least one embodiment.

As noted above, the computing resource service provider may provide a number of services which a customer may use to support its business operations. Accordingly, FIG. 3 is an illustrative example of one or more services provided by a computing resource service provider 302 in accordance with at least one embodiment. In this illustrative example, the computing resource service provider 302 provides at least five types of services. The services provided by the computing resource service provider 302, in this example, include a virtual computer system service 304, an object-based data storage service 306, a database service 308, an account service 310, an authentication service 312 and one or more other services 314, although not all embodiments of the present disclosure will include all such services and additional services may be provided in addition to or as an alternative to services explicitly described herein.

The virtual computer system service 304 may be a collection of computing resources configured to instantiate virtual machine instances onto virtual computing systems on behalf of the customers of the computing resource service provider 302. Customers of the computing resource service provider 302 may interact with the virtual computer systems' service to provision and operate virtual computer systems that are instantiated on physical computing devices hosted and operated by the computing resource service provider 302. The virtual computer systems may be used for various purposes, such as to operate as servers supporting a website. Other applications for the virtual computer systems may be to support database applications, electronic commerce applications, business applications and/or other applications.

The object-based data storage service 306 may comprise a collection of computing resources that collectively operate to store data for a customer. The data stored in the object-based data storage service 306 may be organized into data objects. The data objects may have arbitrary sizes except, perhaps, for certain constraints on size. Thus, the object-based data storage service 306 may store numerous data objects of varying sizes. The object-based data storage service 306 may operate as a key value store that associates data objects with identifiers of the data objects which may be used by the customer to retrieve or perform other operations in connection with the data objects stored by the data storage service 306. Access to the data storage service may be through appropriately configured API calls.

The database service 308 may be a collection of computing resources that collectively operate to run one or more databases for one or more customers. Customers of the computing resource service provider 302 may operate and manage a database from the database service 308 by utilizing appropriately configured API calls. This, in turn, may allow a customer to maintain and potentially scale the operations in the database.

The account service 310 may be a collection of computing resources that collectively operate to maintain customer account information for each customer of the computing resource service provider 302. The account service 310 may include, for example, the customer name, address, phone numbers, billing details and other personal identification information for each customer of the computing resource service provider 302. Additionally, the account service 310 may include cryptographic keys or other credentials that may be used to verify that a customer has the proper authorization to access the one or more services provided by the computing resource service provider 302. Accordingly, the account service 310 may be configured to operate in conjunction with the authentication service 312 to enable customer connections and limit access to the one or more services provided by the computing resource service provider 302 should the customer fail to provide adequate authentication proof (e.g., digital signature, password, etc.). The customer may be able to interact with the account service 310 through one or more communications networks, such as the Internet, in order to provide and update the account information as necessary. Accordingly, the customer may access the account service 310 to perform a key exchange to ensure both the customer and the computing resource service provider 302 have a copy of the cryptographic keys necessary to validate a physical connection.

The authentication service 312, as noted above, may serve to authenticate and verify a connection between the computing resource service provider 302 and a customer. For instance, after a direct connection has been established between a customer and the computing resource service provider 302 (e.g., for example, through the use of routers located in a colocation, as illustrated in FIG. 2), the authentication service 312 may transmit an authentication request to the customer in order to ensure that the customer has authorization to access the one or more services provided by the computing resource service provider. Accordingly, the authentication service 312 may be configured to receive authentication proof from the customer and perform one or more operations to determine whether the authentication proof provided is authentic. For instance, the authentication service 312 may interact with the account service 310 to obtain necessary customer information for verifying the provided authentication proof (e.g., one or more cryptographic keys, passwords, customer identification numbers, etc.). If the authentication proof is not adequate, the authentication service 312 may transmit one or more executable commands to the computing resource service provider 302 router to limit customer access to the one or more services until the customer is able to provide adequate authentication proof. The authentication service 312 may be configured to perform this authentication process at different times to ensure that a connection between the customer and the computing resource service provider 302 is not compromised.

The authentication service 312 may additionally be configured to respond to an authentication request transmitted by a customer to the computing resource service provider 302. For instance, after a direct connection has been established between a customer and the computing resource service provider 302, the customer may transmit an authentication request to the computing resource service provider in order to verify that the connection is authentic and has not been compromised. The authentication service 312 may process the request and provide authentication proof necessary to verify that the connection is authentic. For example, the authentication service 312 may be configured to access the account service 310 to locate the account information related to the customer and identify the type of authentication proof required to authenticate the connection. In this fashion, the authentication service 312 may provide added security to the connection between a customer and the computing resource service provider 302.

The computing resource service provider 302 may additionally maintain one or more other services 314 based on the needs of its customers. For instance, the computing resource service provider 302 may maintain a block-level data storage service which may comprise a collection of computing resources that collectively operate to store data for a customer by utilizing block-level data storage volumes. The storage volumes may be configured to behave like raw, unformatted block storage devices with a block level customer interface. Accordingly, a customer, through properly configured API calls to the service, may create a file system on top of the block-level data storage volumes or utilize the volume as a block-level storage device (e.g., a hard drive). Other services include, but are not limited to, object-level archival data storage services, services that manage other services and/or other services.

Figure 4:
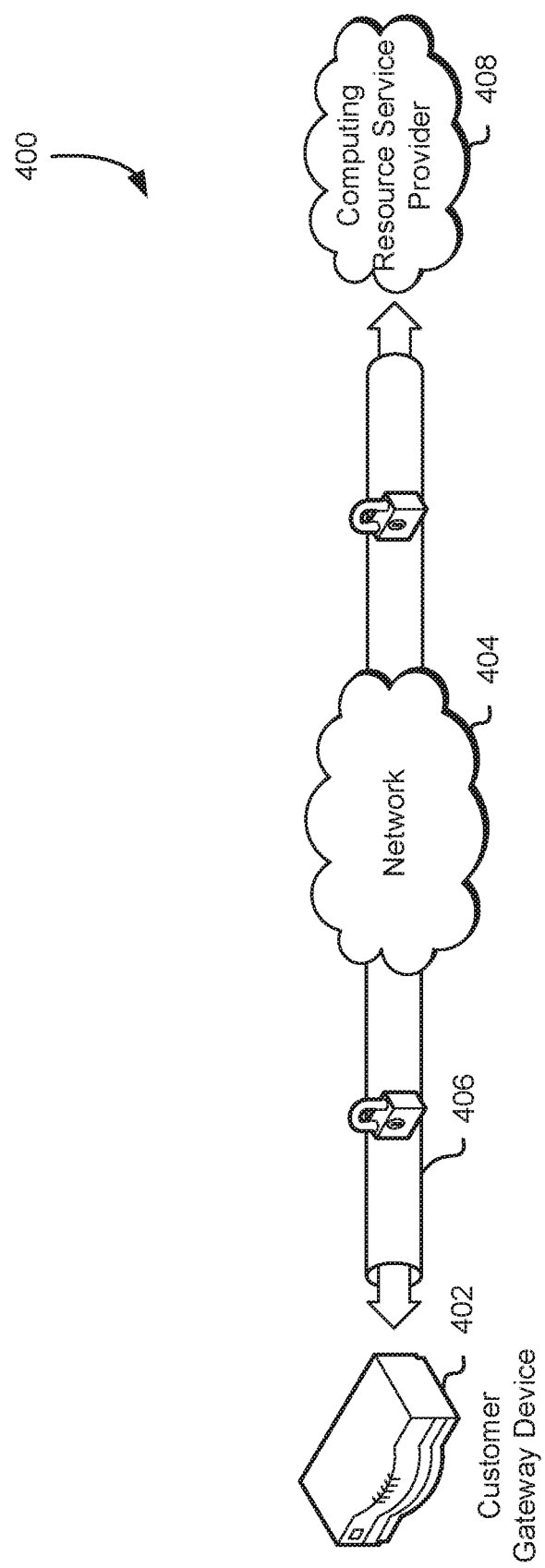
FIG. 4 shows an illustrative example of an environment in which various embodiments can be practiced.

As noted above, the computing resource service provider may utilize an authentication service to authenticate a direct, physical connection between a customer and the computing resource service provider. However, the use of the authentication service to authenticate a connection may be used for other types of connections. Accordingly, FIG. 4 is an illustrative example of an environment 400 in which various embodiments can be practiced. In the environment 400, a customer may utilize a customer gateway device 402 to communicate with the computing resource service provider 408 through one or more communications networks 404, such as the Internet. While the Internet is used extensively throughout the present disclosure for the purpose of illustration, the present disclosure is not so limited. For instance, the gateway device 402 may be used to communicate with the computing resource service provider 408 through a local area network (LAN), intranet, extranet, a wireless network and any combination thereof.

The customer gateway device 402 may be any device configured to act as an entrance, or "gateway," to a network 404. The customer gateway 402 may be configured to convert data originating in a customer computer system into data packets that may be transmitted over the network 404 to an intended recipient (e.g., in this case, the computing resource service provider 408). Additionally, the customer gateway device 402 may be configured to receive any data packets transmitted through the network 404 and to convert these data packets into data that is readable by a customer computer system. For example, if the customer gateway device 402 is connected to the computing resource service provider 408 through the Internet, the customer gateway device 402 may be configured to use a suite of communications protocols, such as the Transmission Control Protocol/Internet Protocol (TCP/IP), to transmit data packets to the computing resource service provider 408. The IP component may provide routing from the customer computer system to the computing resource service provider 408 through the Internet. This may be accomplished through the use of IP addresses (e.g., IPv4 or IPv6 addresses) that may correspond to the customer computer system and the computing resource service provider 408 systems. The TCP component may be responsible for verifying the correct delivery of data from the customer to the computing resource service provider 408.

The customer computer systems and the computing resource service provider 408 computing systems may additionally use an additional network protocol to identify the most efficient or expedient pathway for routing data packets. For instance, the various computer systems may utilize a border gateway protocol (BGP) in order to exchange routing information in the network 404. The customer computer systems and computing resource service provider computer systems may use BGP to determine the available gateway devices (e.g., routers) available to transmit and receive data packets sent over the network 404 (e.g., Internet). Thus the computer systems using BGP may rely on TCP/IP in order to transmit the data packets through the various routers connected to the computer systems and that support the network 404.

The protocol used to connect the customer gateway device 402 to the computing resource service provider 408 through the network 404 may include a security protocol necessary to verify that the customer and computing resource service provider are authorized to participate in the secure connection 406. The secure connection 406 may be a virtual private network (VPN) operated through one or more secure tunnels (e.g., Internet Protocol Security (IPsec) tunnels using one or more encryption methods). Thus, when the initial connection is made between the customer and the computing resource service provider 408 through the network 404 using this security protocol, the computing resource service provider may transmit an authentication request to the customer to determine whether the customer has the authority to participate in this secure connection 406. Accordingly, the customer, through the customer gateway device 402, may transmit a data packet comprising the IP address of an authentication service provided by the computing resource service provider 408 and authentication proof (e.g., password, digital signature, etc.) subject to the security protocol.

Once the authentication service provided by the computing resource service provider 408 receives the data packet from the customer gateway device 402, the authentication credential received may utilize a hash function to hash the received data, along with a cryptographic key associated with the customer, to generate an expected customer digital signature. Accordingly, the computing resource service provider 408 may compare this expected customer digital signature to the digital signature received from the customer gateway device 402 to determine if these signatures match. If there is a match, the computing resource service provider 408 may re-configure its own gateway devices to permit the customer to access one or more other services provided by the computing resource service provider. However, if digital signatures do not match, any data packets transmitted to the one or more other services may be denied. Additionally, the customer may use the customer gateway device 402 to transmit an authentication request to the computing resource service provider 408. Accordingly, the computing resource service provider 408 may transmit a data packet comprising the IP address of the customer computing system and an authentication credential (e.g., digital signature, password, etc.) subject to the security protocol. If the authentication credential received is inadequate, the customer may transmit one or more executable commands to the customer gateway device 402 to limit or terminate the secure connection 406 to the computing resource service provider 408.

Figure 5:
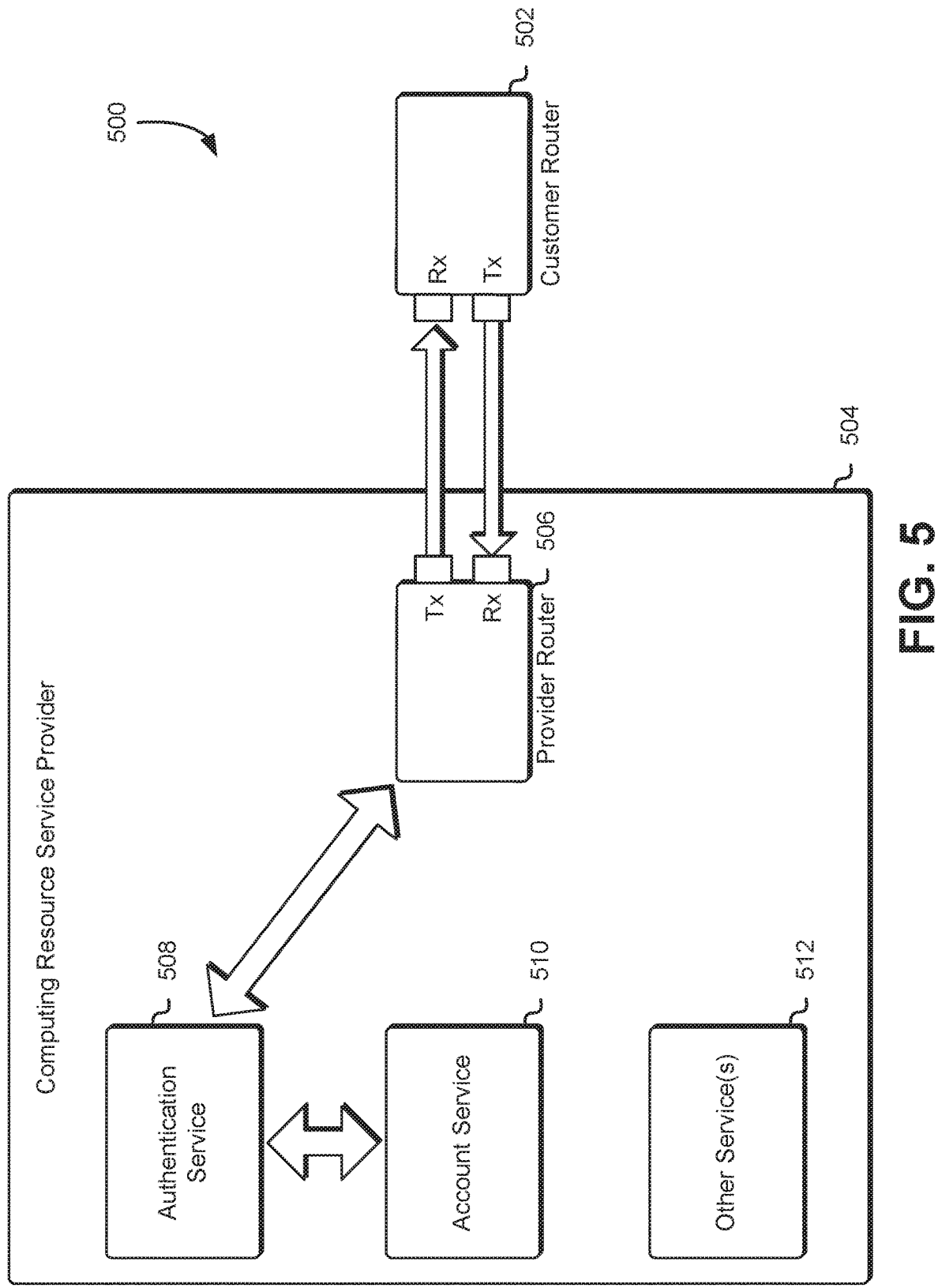
FIG. 5 shows an illustrative example of an environment in which a physical connection is authenticated in accordance with at least one embodiment.

FIG. 5 is an illustrative example of an environment 500 in which a physical connection is authenticated in accordance with at least one embodiment. In the environment 500, a customer may submit a request to a computing resource service provider 504 to establish a direct connection with the computing resource service provider. Accordingly, the computing resource service provider 504 may generate a letter of authority to physically connect a customer router 502 to a computing resource service provider router 506. A data technician may be deployed to establish the physical connection, as illustrated in FIG. 2.

Once the physical connection has been established between the customer router 502 and the computing resource service provider router 506, the computing resource service provider 504 may utilize an authentication service 508 to verify that the customer transmissions through the physical connection originate from the authorized customer. Accordingly, the authentication service 508 may be configured to transmit an authentication request through the computing resource service provider router 506. The computing resource service provider router 506 may be configured to transmit this authentication request using a security protocol, as described above, to elicit a response from the customer.

Accordingly, the customer router 502 may receive this authentication request and transmit the request to one or more customer computer systems for processing. The one or more customer computer systems may be configured to prepare a data packet comprising the necessary authentication proof (e.g., password, digital signature, etc.) to verify the identity of the customer, along with any other requisite information necessary to access the other services 512 available to the customer. This data packet may be transmitted to the customer router 506, which, in turn, may utilize the security protocol to transmit the data packet comprising the authentication proof.

The computing resource service provider router 506 may transmit the received customer data packet to the authentication service 508 for verification. Accordingly, the authentication service 508 may be configured to extract the authentication proof from the data packet. The authentication proof may include a digital signature which may need to be verified using a hash of the received data and a cryptographic key maintained by the computing resource service provider and specific to the customer. Thus, the authentication service 508 may be configured to interact with an account service 510 managed by the computing resource service provider 504 to obtain relevant customer information. For instance, the account service 510, as illustrated above, may comprise customer account information for each customer of the computing resource service provider 504. For example, the customer account may comprise one or more cryptographic keys that may be used to generate an expected customer digital signature in order to verify the received digital signature is authentic and thus verify the identity of a customer computer system connected directly to the computing resource service provider 504. Thus, the account service 510 may be configured to transmit these keys to the authentication service 508.

The authentication service 508 may use the cryptographic keys from the account service 510, along with data received from the customer, to generate an expected customer digital signature and attempt to match this signature with the customer authentication proof. If there is a resulting match between the digital signatures, the authentication service 508 may transmit one or more executable commands to the computing resource service provider router 506 to allow the customer to access the other services 512 provided by the computing resource service provider 504. However, if no match can be established, the authentication service 508 may transmit an informative message to the customer comprising the reason why access to the other services 512 has been denied.

In another embodiment, once the physical connection has been established between the customer router 502 and the computing resource service provider router 506, the customer may generate one or more data packets comprising customer information and a digital signature, such as through one or more appropriately configured API calls to the service, which may be used to verify the identity of the customer. These data packets may be transmitted over the physical connection using an authentication protocol to the computing resource service provider router 506. This router 506 may be configured to transfer these data packets to an authentication service 508 for further processing.

The authentication service 508 may be configured to interact with an account service 510 in order to obtain one or more cryptographic keys necessary to generate an expected customer digital signature. Accordingly, the authentication service 508 may be configured to hash the cryptographic keys and the received customer data to generate this expected customer digital signature. This signature may be compared with the received customer digital signature to determine if there is a match. If there is a match, the customer transmissions may be deemed authentic, causing the authentication service 508 to transmit one or more executable instructions to the provider router 506 to enable the customer to access the one or more other services 512 provided by the computing resource service provider 504. For instance, if the customer transmissions are deemed to be authentic, the computing resource service provider 504 may allow a customer to provision one or more virtual interfaces to access these other services 512.

Additionally, the verification of the customer identity may cause the authentication service 508 to generate one or more data packets comprising a digital signature for the computing resource service provider 504 which may be transmitted to the customer router 502. This may enable the customer to verify the identity of the computing resource service provider 504.

Figure 6:
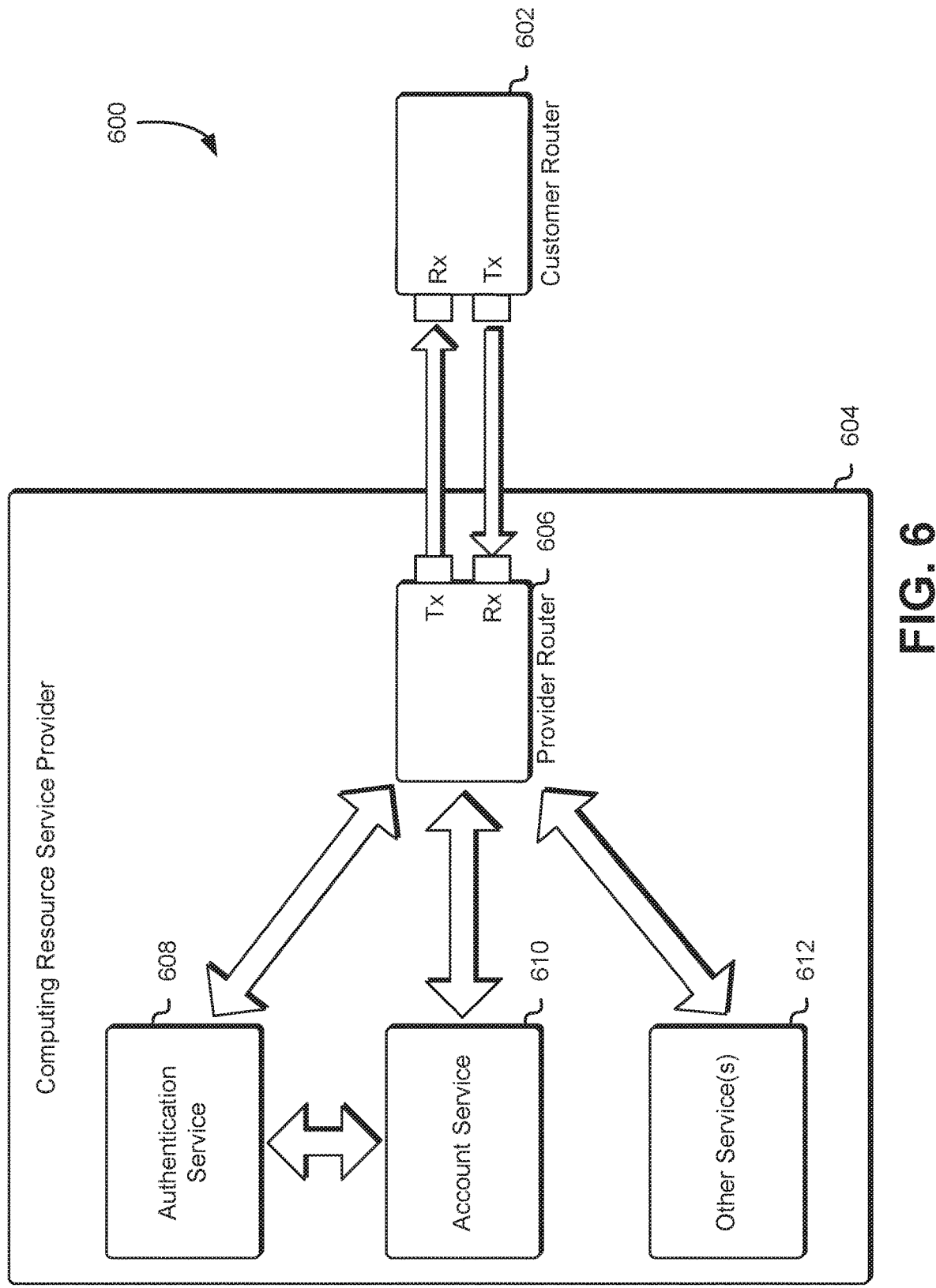
FIG. 6 shows an illustrative example of an environment in which a connection with one or more services is managed upon initial authentication in accordance with at least one embodiment.

After the initial authentication of the customer has been made, the customer may now access a variety of services offered by the computing resource service provider. However, further authentication requests may be transmitted between the customer and the computing resource service provider to ensure that the connection has not been compromised. Accordingly, FIG. 6 is an illustrative example of an environment 600 in which a connection with one or more services is managed upon initial authentication in accordance with at least one embodiment. In the environment 600, the customer may transmit one or more signals through the customer router 602 to access one or more other services 612 provided by the computing resource service provider 604. Accordingly, these one or more signals may be received by the computing resource service provider router 606 and transmitted to the one or more other services 612 for disposition. For instance, the customer may utilize the customer router 602 to provision a virtual interface, which may be necessary to access the one or more services 612. In this fashion, the customer may utilize the one or more services 612 for his/her purposes.

At any point during the interactions between the customer and computing resource service provider 604 and its associated other services 612, the authentication service 608 may transmit an authentication request to the customer, via the computing resource service provider router 606 and the customer router 602, to ensure that the connection has not been compromised (e.g., a third party has intercepted the connection, etc.). Accordingly, the customer may use one or more computer systems maintained and operated by the customer to transmit authentication proof necessary to satisfy the received authentication request. This authentication proof may be transmitted through the customer router 602. As in the initial authentication process illustrated in FIG. 5, the authentication proof may include a password, digital signature or any other credential requested in the authentication request. This authentication proof may be transmitted in one or more data packets configured according to a security protocol to the computing resource service provider 604.

The computing resource service provider router 606 may receive this authentication proof and accordingly deliver the proof to the authentication service 608 for verification. As illustrated in FIG. 5, the authentication service 608 may be configured to interact with an account service 610 to obtain relevant customer information (e.g., cryptographic keys, customer account credentials, etc.) necessary to evaluate the received authentication proof. If the authentication proof provided by the customer is confirmed to be authentic, the authentication service 608 may allow continued customer access to the other services 612. However, if the provided authentication proof does not comport with the relevant customer information obtained from the account service 610, the authentication service 608 may transmit one or more executable instructions to the computing resource service provider router 606 to limit customer access to the other services 612 provided by the computing resource service provider 604. For instance, the computing resource service provider router 606 may be configured to reduce the available connection bandwidth to the customer or terminate the connection or the virtual interface altogether. Alternatively, the authentication service 608 may be configured to again interact with the account service 610 to identify one or more actions that may be taken in the event of a failed authentication challenge. For example, the customer may specify that the computing resource service provider 604 is to monitor and log all activities related to a user purporting to be the customer that is accessing the other services 612.

Alternatively, at any point during the interactions between the customer and the computing resource service provider 604 and its associated other services 612, the computer systems operated by the customer may transmit one or more authentication requests to the computing resource service provider to ensure that the connection has not been compromised. Once the request has been received by the computing resource service provider router 606, the request may be transmitted to the authentication service 608 for processing. The authentication service 608 may be configured to interact with the account service 610 to obtain the relevant customer information, including, but not limited to, one or more cryptographic keys necessary to generate authentication proof to satisfy the customer authentication request. For instance, the authentication service 608 may be configured to use a hash function to hash data and the cryptographic key to generate a digital signature. Accordingly, the authentication service 608 may generate one or more data packets that may comprise the authentication proof (e.g., digital signature) along with other data that may be transmitted to the customer computer systems via the physical connection between the computing resource service provider router 606 and the customer router 602.

If the authentication proof provided by the computing resource service provider 604 is inadequate, the customer computing systems may be configured to transmit executable commands that may cause the customer router 602 to terminate the connection. This may include generating a request for a data technician to sever the physical connection or the complete ceasing of transmission of one or more signals through the physical connection. However, if the authentication proof is adequate, such that the connection with the computing resource service provider 604 is indeed authentic, the customer may continue to utilize the physical connection to access the one or more other services 612 necessary to support its business.

In another embodiment, the customer may generate additional data packets comprising cryptographic authentication information, such as through one or more appropriately configured API calls to the service, which may be used to verify the identity of the customer. As noted above, these data packets may be transmitted over the physical connection using an authentication protocol to the computing resource service provider router 606. This router 606 may be configured to transfer these data packets to an authentication service 608 for further processing.

As noted above, the authentication service 608 may be configured to interact with an account service 610 in order to obtain one or more cryptographic keys necessary to generate an expected customer digital signature. Accordingly, the authentication service 608 may be configured to hash the cryptographic keys and the received customer data to generate this expected customer digital signature. This signature may be compared with the received customer digital signature to determine if there is a match. If there is a match, the customer transmissions may be deemed authentic, causing the authentication service 608 to allow continued access to the one or more services 612 provided by the computing resource service provider 604. However, if there is no match, the authentication service 608 may perform one or more actions to limit or even terminate the existing connection, as illustrated above.

In addition, if the digital signatures match, the authentication service 608 may generate one or more data packets comprising a computing resource service provider 604 digital signature which may be transmitted to the customer router 602. This may enable the customer to verify the identity of the computing resource service provider 604 in order to continue the present direct connection.

Figure 7:
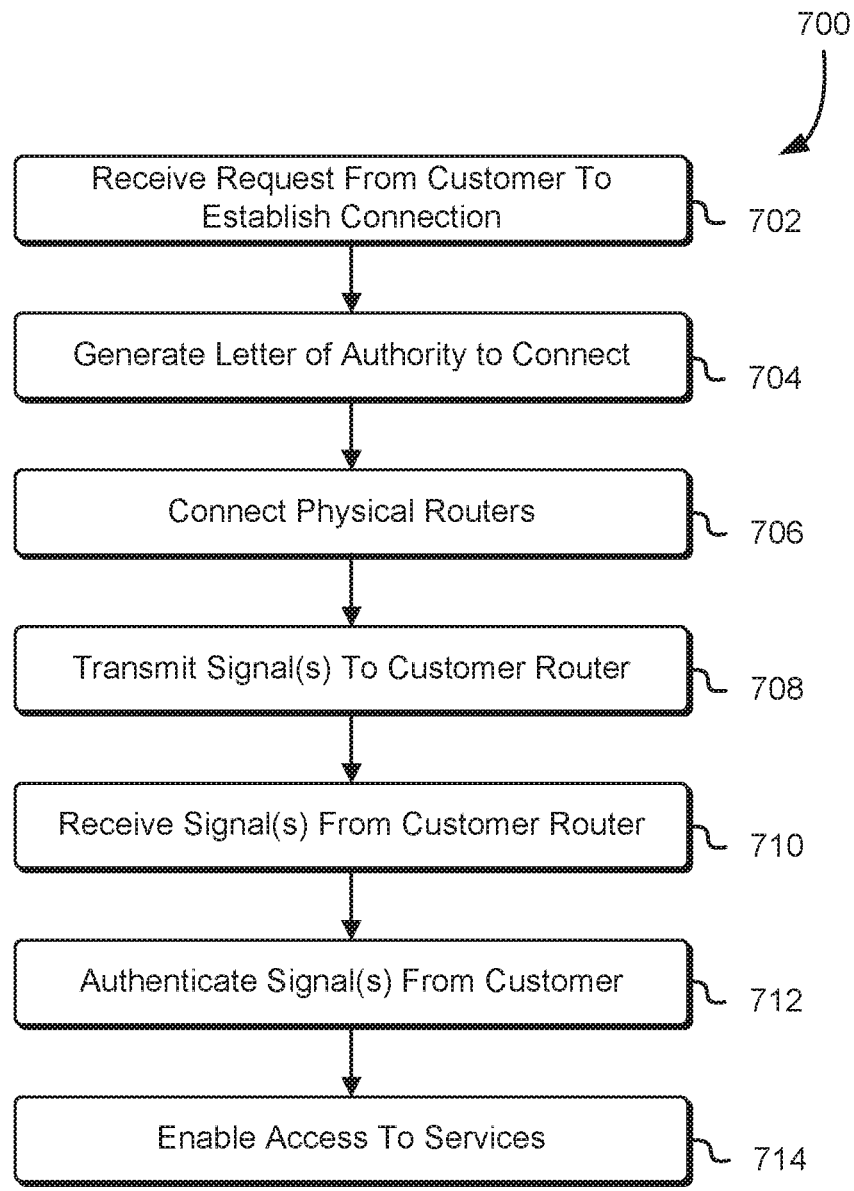
FIG. 7 shows an illustrative example of a process for establishing a physical connection between a customer and a computing resource service provider in accordance with at least one embodiment.

As noted above, a direct connection may be established between a customer router and a computing resource service provider to enable a customer to access one or more services provided by the computing resource service provider. Accordingly, FIG. 7 is an illustrative example of a process 700 for establishing a physical connection between a customer and a computing resource service provider in accordance with at least one embodiment. The process 700 may be performed by a variety of networking and computing components operated by the computing resource service provider, as well as one or more services maintained and operated by the computing resource service provider (e.g., authentication and account services).

A customer may contact a computing resource service provider to request the creation of a direct physical connection between a customer router and a computing resource service provider router. For instance, the customer may desire to establish a dedicated network connection between the customer computing systems and the computing resource service provider computing systems. This may enable the customer to access the one or more services provided by the computing resource service provider to support his/her business operations. Accordingly, the process 700 may include a computing resource service provider receiving 702 a request from the customer to establish this direct connection.

Once the computing resource service provider has received the request from the customer, the computing resource service provider may generate 704 a letter of authority to connect the customer router to the computing resource service provider router. As illustrated in FIG. 2, the customer routers and the computing resource service provider routers may be located in a data center or colocation center. Thus, the letter of authority may grant a data technician (e.g., employee of the computing resource service provider, customer or contracted third party) permission to establish the connection between the customer router and the computing resource service provider router.

The data technician may use one or more cables to connect 706 the physical routers. This may entail identifying the customer and computing resource service provider routers within the colocation center and the corresponding ports required to establish the connection. For instance, the data technician may insert one end of a set of cables (e.g., fiber-optic, copper, or other material) in a receiving and transmission port of the customer router and connect the other end of the cables to a receiving and transmission port of the computing resource service provider. If the colocation center includes one or more patch panels, the data technician may connect the cables from the customer router, through the patch panels, and from the final patch panel ports to the computing resource service provider router. The data technician may use a diagnostic tool to ensure proper connectivity or may contact the computing resource service provider to inform the computing resource service provider that the connection has been established.

It should be noted that the authentication process may be port independent. For instance, in an embodiment, the customer operates and maintains a cage within a colocation center that comprises the customer router and routers maintained and operated by a secondary or tertiary customer (e.g., a customer of the customer with the existing relationship with the computing resource service provider). At any point, the customer may disconnect the physical connection between the customer router and the computing resource service provider and reconnect the physical connection with a router maintained by a secondary or tertiary customer. The secondary or tertiary customer may maintain a set of credentials that may be associated with this secondary or tertiary customer and may be used to provide authentication proof to the computing resource service provider. Thus, the computing resource service provider may accordingly authenticate the physical connection with this secondary or tertiary customer through this physical connection. The secondary or tertiary customer may accordingly provide authentication proof to the computing resource service provider to authenticate the connection, as will be illustrated below.

In various embodiments, the customer and/or provider may change a network device port used to establish a direct physical connection. For example, the customer may request an upgrade of an existing physical connection (e.g., transition from a one gigabyte port to a ten gigabyte port on a computing resource service provider router) resulting in a different connection between the customer router and the computing resource service provider router. In this instance, the authentication process may be repeated once the connection has been established without any systemic changes to the process. This may ensure that the authentication process is port independent.

Once the physical routers in the colocation center have been connected and the data technician has provided confirmation of the connection, the computing resource service provider may use the router to transmit 708 one or more signals to the customer router. As illustrated above in connection with FIG. 5, the computing resource service provider may operate and maintain an authentication service, which may be configured to transmit authentication requests to a customer in order to verify that the customer is authorized to connect to one or more services provided by the computing resource service provider. Accordingly, the authentication service may be configured to generate one or more data packets subject to a security protocol comprising this authentication request. These data packets may be transmitted by the computing resource service provider router to the customer router via the physical connection established in the colocation center.

When the customer router receives these one or more data packets from the computing resource service provider, the customer router may transmit these data packets to the customer computing systems for processing. Based on the authentication request, the customer computer systems may be configured to utilize a hash function and a cryptographic key to generate a digital signature. The digital signature may comprise the authentication proof necessary to satisfy the authentication request. Accordingly, the customer computer systems may be configured to generate one or more data packets comprising the authentication proof required to satisfy the request along with other customer data. These data packets may be created according to the security protocol established for the transmission of authentication information.

The data packets comprising the customer authentication proof may be transmitted to the computing resource service provider through the physical connection using the customer router. Accordingly, the computing resource service provider may receive 710 the signals comprising the customer data packets from the customer router. The signals originating from the customer router may be received by the computing resource service provider router, which may be configured to decompose the signals from the customer and extract the one or more data packets. The data packets, which may be addressed to the authentication service, may be transmitted to the authentication service for processing.

As noted above, the authentication service may be configured to extract the customer authentication proof (e.g., digital signature) from the received data packets in order to verify the identity of the customer. Thus, the authentication service may attempt to authenticate 712 the digital signature received through the physical connection. As noted above, the authentication service may be configured to interact with an account service in order to obtain relevant customer information. For instance, the authentication service may obtain one or more customer cryptographic keys (e.g., a customer key generated using one or more cryptographic methods, such as elliptic-curve cryptography) from the account service in order to verify the authentication proof. For instance, the authentication service may be configured to hash the customer data received, along with the cryptographic key, to generate an expected customer digital signature. If this expected customer digital signature matches the received digital signature from the customer, then the signals are authentic and the customer identity is verified.

If the authentication proof provided by the customer is adequate (e.g., the digital signatures produce a match), the authentication service may enable 714 the customer to access the one or more services provided by the computing resource service provider. In order to enable customer access to the one or more services, the authentication service may be configured to transmit one or more executable instructions to the computing resource service provider router to re-configure the router to allow the customer to transmit one or more signals to access the one or more services. For instance, the computing resource service provider router may be configured to allow any data packets comprising a recipient IP address of one or more services to be delivered to the one or more services. Additionally, the authentication may be configured to transmit one or more executable instructions to the computing resource service provider router to allow a customer to provision a virtual interface, which may be used to access these services. In this fashion, the customer may be able to access the one or more services provided by the computing resource service provider.

Figure 8:
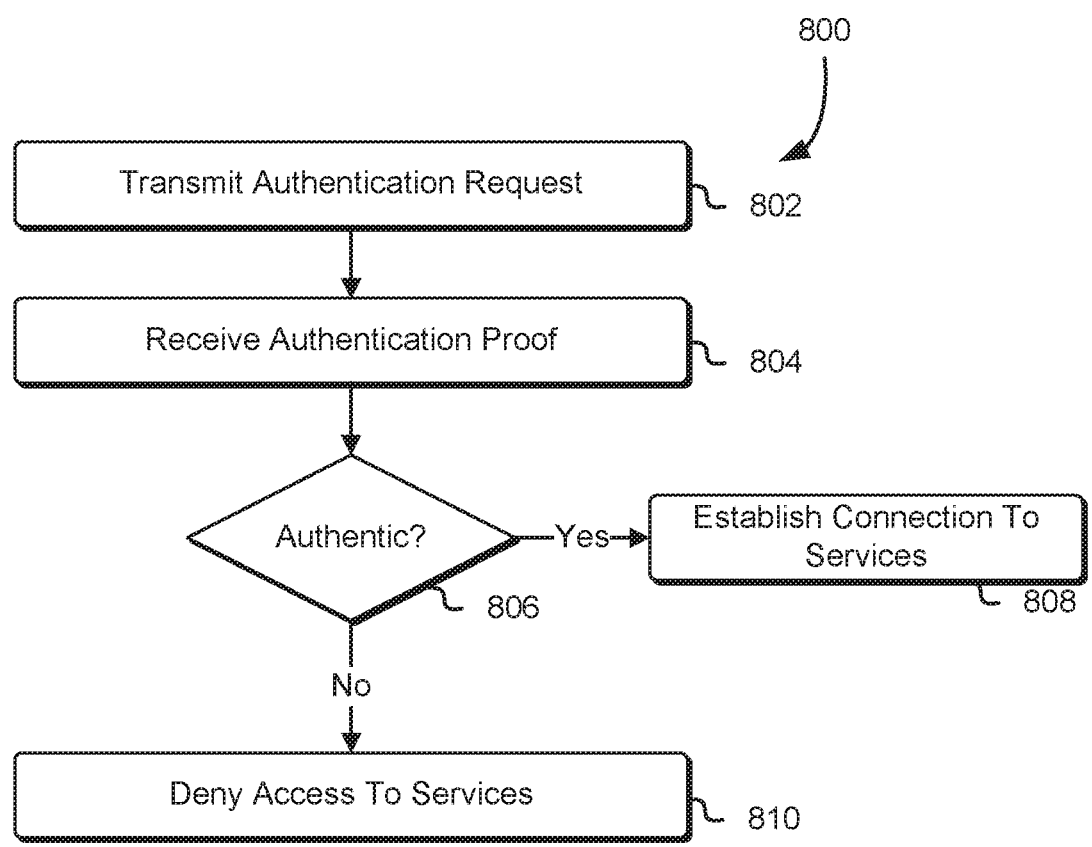
FIG. 8 shows an illustrative example of a process for authenticating a connection for the first time in accordance with at least one embodiment.

As noted above, the authentication service may be configured to verify that the customer has the authority to access the one or more services provided by the computing resource service provider after the physical connection between the customer and the computing resource service provider has been established. Accordingly, FIG. 8 is an illustrative example of a process 800 for authenticating a connection for the first time in accordance with at least one embodiment. As noted above, the computing resource service provider and customer may establish a physical connection through the use of routers located in a colocation center. Once the physical connection has been established, there is a risk that an unauthorized third party may interfere with the connection (e.g., attempt to impersonate the customer and access customer information). Accordingly, the computing resource service provider may include an authentication service that may be configured to transmit 802 an authentication request to the customer to verify the customer has the authority to access the requested services.

As noted above, the authentication service may be configured to generate one or more data packets comprising the authentication request which may be sent through the physical connection. These data packets may additionally be configured according to a security protocol in addition to other standard protocols (e.g., TCP/IP, IPsec, etc.) such that the data packets may be processed by the customer computer systems and the transmission is secure. Accordingly, the authentication service may be configured to transmit these data packets to the computing resource service provider router which, in turn, may transmit the data packets to the customer.

The customer may receive these data packets through the customer router that may be physically connected to the computing resource service provider router in the colocation center. Accordingly, the data packets may be transmitted to one or more customer computer systems for processing, such that the one or more computer systems may generate one or more data packets in response to the request comprising the necessary authentication proof to verify that the customer has the authority to access the services provided by the computing resource service provider. As is the case with the data packets generated using the authentication service, the one or more customer computer systems may be configured to generate one or more data packets configured according to the security protocol in addition to the other standard protocols. Thus, these data packets may be transmitted from the customer router to the computing resource service provider router for processing. The computing resource service provider may transmit the one or more data packets received from the customer to the authentication service.

Accordingly, the authentication service may be configured to receive 804 the authentication proof from the customer. Based on the type of authentication proof requested, the authentication service may be configured to interact with an account service to obtain customer account information necessary to verify the authentication proof. For instance, the authentication service may obtain a cryptographic key associated with the customer account to generate an expected customer digital signature which may be used to determine whether the digital signature received from the customer is authentic.

Accordingly, the authentication service may be configured to use the cryptographic key to generate an expected customer digital signature to compare to the received digital signature from the customer to determine whether there is a match. Accordingly, the authentication service may be configured to determine 806 whether the customer authentication proof is authentic. If the authentication proof received from the customer matches the expected customer digital signature generated by the authentication service, the authentication service may establish 808 a connection to the one or more services provided by the computing resource service provider. For instance, the authentication service may be configured to transmit one or more executable instructions to the computing resource service provider router that may cause the router to transmit any data packets received from the customer addressed to the one or more services provided by the computing resource service provider to these one or more services. Thus, the customer may be able to access these services to support its business.

However, if the authentication proof received from the customer does not match the expected customer digital signature generated by the authentication service, the authentication service may deny 810 the customer access to the services provided by the computing resource service provider. For instance, the authentication service may be configured to transmit one or more executable commands to the computing resource service provider router which may cause the router to reject any data packets from the customer that may be addressed to these one or more services. Alternatively, if the configuration of the computing resource service provider router during the initial physical connection includes automatically rejected any data packets addressed to the one or more services, the authentication service may not transmit any additional instructions to the router. Thus, the router may continue to reject these data packets from the customer.

Figure 9:
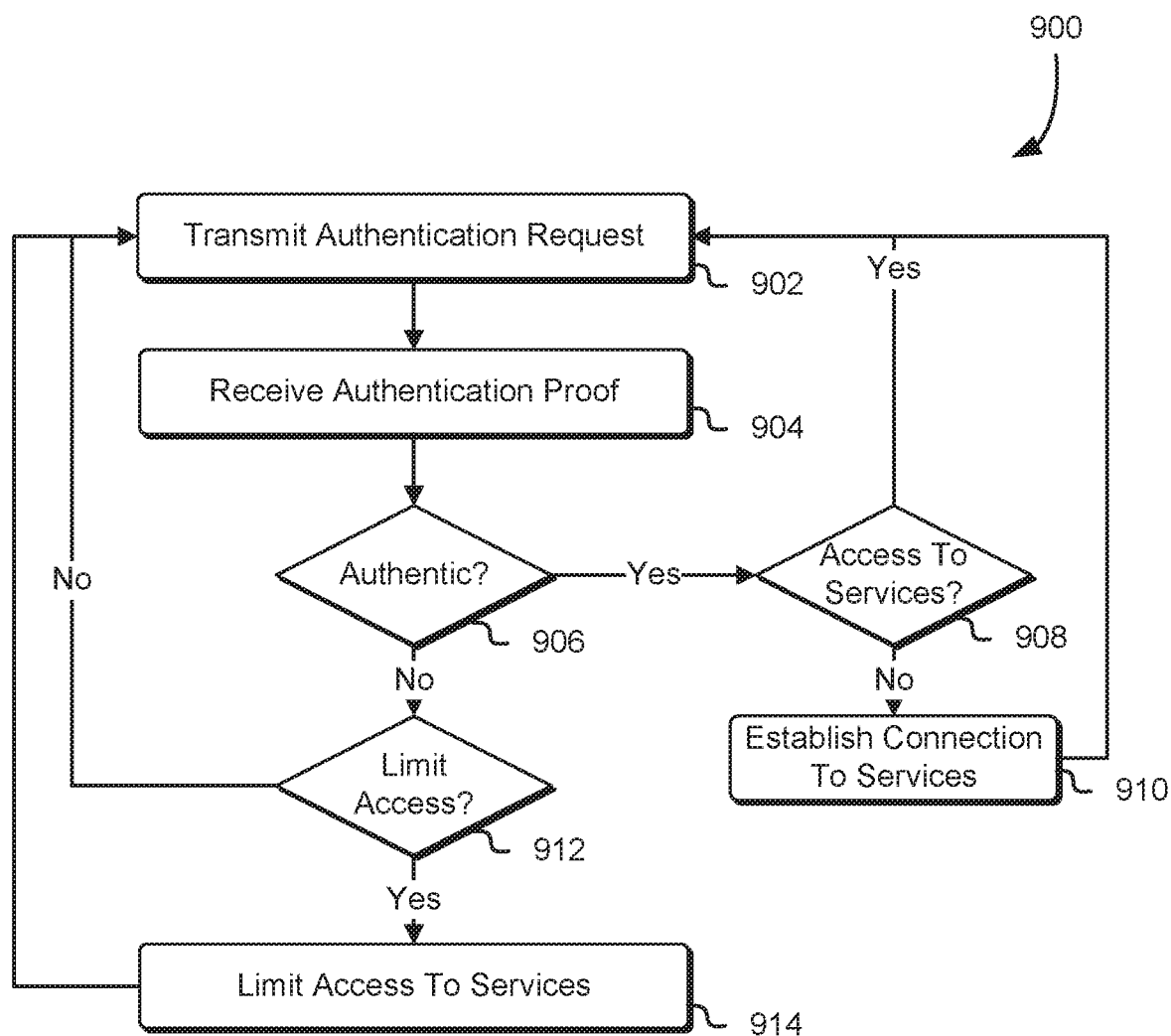
FIG. 9 shows an illustrative example of a process for authenticating a connection after a connection has been previously established in accordance with at least one embodiment.

Once the customer has successfully connected to the one or more services, the customer may continue to utilize these services to support its business. The authentication service, however, may be configured to continue to submit authentication requests to the customer in order to ensure that the connection has not been compromised. Accordingly, FIG. 9 is an illustrative example of a process 900 for authenticating a connection after a connection has been previously established in accordance with at least one embodiment. As in the process illustrated in FIG. 8, an authentication service may be configured to transmit 902 an authentication request to a customer. This authentication requested may be transmitted in one or more data packets configured according to one or more communications protocols (e.g., TCP/IP) and a security protocol necessary for the security of the physical connection.

As noted above, the customer may operate one or more computer systems configured to further operations of the customer's business. Accordingly, these one or more computer systems may be configured to process the authentication request and generate one or more data packets comprising the necessary authentication proof to satisfy the request. The authentication proof, as noted above, may include one or more customer credentials (e.g., passwords, digital signatures, etc.). As in the data packets comprising the authentication request, the data packets generated using the customer computing systems may be configured to one or more communications protocols and a security protocol. These data packets may be delivered using a customer router which may be directly (e.g., through physical cables in a colocation center) connected to a computing resource service provider router.

The computing resource service provider router may thus be configured to receive 904 the data packets comprising the authentication proof and transmit these data packets to the authentication service operated by the computing resource service provider. Accordingly, the authentication service may be configured to interact with an account service operated by the computing resource service provider to obtain necessary information to verify the authentication proof. This may enable the authentication service to determine 906 whether the customer authentication proof is authentic. For instance, the authentication service may obtain one or more cryptographic keys necessary to generate an expected customer digital signature which may be used to verify the received digital signature from the customer.

If the authentication proof satisfies the authentication request (e.g., the provided customer digital signature matches the expected customer digital signature generated by the authentication service), the authentication service may further determine 908 whether the customer currently has access to the one or more services provided by the computing resource service provider. If the computing resource service provider has previously established a connection between the customer and these services, the authentication service may be configured to continue to allow the customer to access these services. Accordingly, the authentication service may be configured to transmit 902 another authentication request to the customer in order to ensure the connection has not been compromised. These subsequent requests may be made at a later time, based at least in part on the configuration of the authentication service.

However, if the customer currently does not have access to the one or more services provided by the computing resource service provider, the authentication service may establish 910 a connection between the customer and these services. For instance, the authentication service may be configured to transmit one or more executable instructions to the computing resource service provider router that causes the router to permit any data packets originating from a customer computer system to be transmitted to the one or more services. Thus, a customer may now access these services to further his/her business. Again, once the connection has been established, the authentication service may continue to transmit 902 authentication requests to the customer to ensure the connection has not been compromised. These subsequent requests may be made daily, weekly, monthly or at varying time intervals, dependent upon the configuration of the authentication service.

If the authentication service evaluates the received authentication proof from the customer and determines that the proof is not authentic, the authentication service may further determine 912 whether to limit the customer's access to the one or more services provided by the computing resource service provider. For instance, the computing resource service provider may allow a customer to define what actions may be taken in the event the connection has been compromised. For example, the customer may specify that the connection should be terminated upon a potential breach. In another example, a customer may prefer to allow the connection to continue uninterrupted while logging all transmissions between the purported customer (e.g., unauthorized third party, etc.) and the computing resource service provider.

Accordingly, the authentication service may be configured to interact with the account service to refer to the customer's instructions in the event of a breach and perform these actions. Alternatively, if the customer has not specified any actions to be taken, the authentication service may refer to one or more default instructions that may cause the service to perform one or more actions with regard to the connection. If the customer's instructions or default instructions include limiting access to the one or more services, the authentication service may proceed to limit 914 the customer's access to these services. For instance, the authentication service may be configured to transmit one or more executable instructions to the computing resource service provider router to throttle the available connection bandwidth available to the customer, thus slowing the ability of the customer to access the services. Alternatively, the connection may be terminated entirely. Other methods for limiting access to the services may additionally be incorporated and are considered to be within the scope of the present disclosure.

Once the connection between the customer and the computing resource service provider has been limited, the authentication service may continue to transmit 902 authentication requests to the customer. Thus, if the customer is able to provide adequate authentication proof in response to a new authentication request, the authentication service may transmit one or more executable instructions to the computing resource service provider router to restore the access to the one or more services. In this fashion, the customer and the computing resource service provider may resolve the issue with the connection, be it an unauthorized third party, expiration of a credential or some other issue, and restore the connection.

If, for example, the customer has specified that the computing resource service provider should not take any actions in the event that the authentication proof is inadequate, the computing resource service provider may allow the connection to continue unfettered. Accordingly, the authentication service may be configured to continue to transmit 902 authentication requests to determine whether issues still remain with regard with the connection. For instance, the authentication service may be configured to terminate a connection after a number of authentication requests have resulted in no adequate authentication proof responses.

Figure 10:
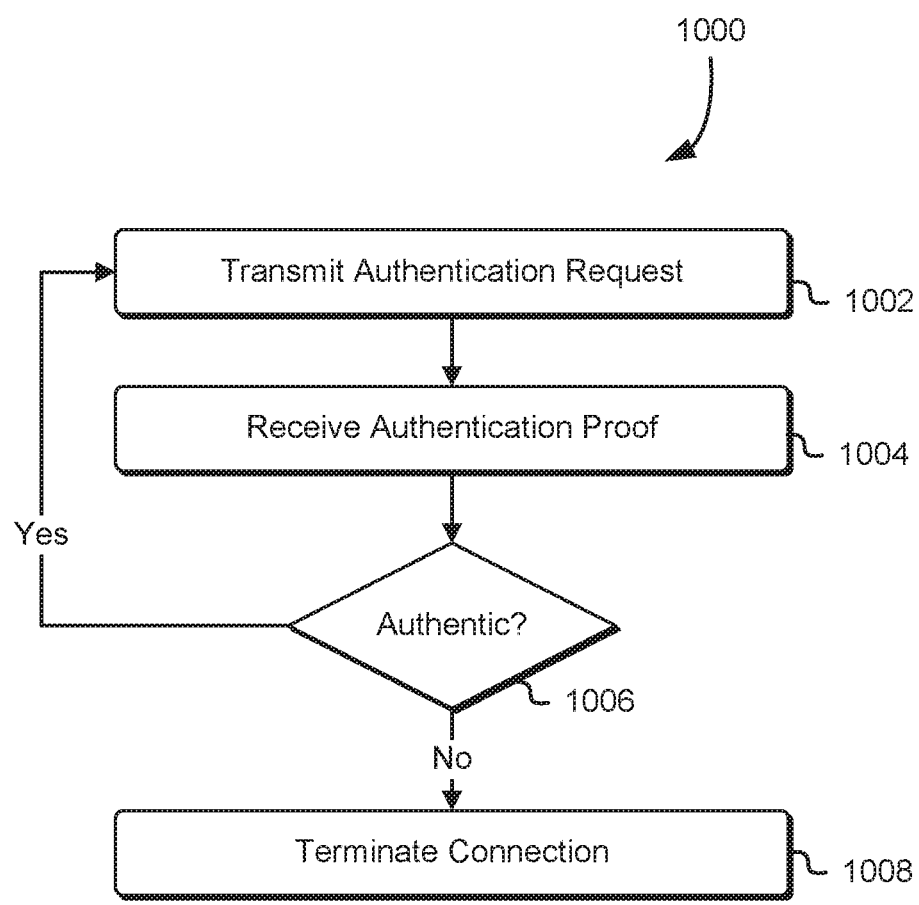
FIG. 10 shows an illustrative example of a process for authenticating a connection in accordance with at least one embodiment.

As noted above, once the physical connection between a customer router and a computing resource service provider router has been established, the computing resource service provider may transmit one or more authentication requests to the customer in order to verify the customer's identity and ensure that the connection has not been compromised. In a similar manner, the customer may utilize one or more computing systems that the customer may use to support his/her business to transmit one or more authentication requests to the computing resource service provider to verify the identity of the provider. Accordingly, FIG. 10 is an illustrative example of a process 1000 for authenticating a connection in accordance with at least one embodiment.

The customer may desire to verify the identity of the party at the other end of the connection prior to transmitting potentially sensitive customer data to the one or more services. Accordingly, the customer may configure one or more computer systems to transmit 1002 an authentication request to the computing resource service provider. As noted above, the customer computing systems may be configured to generate one or more data packets configured according to one or more communications protocols and a security protocol necessary to transmit these data packets over the secure connection. These data packets may comprise an authentication request and customer identification data. Thus, the customer computer systems may transfer these data packets to a customer router which may be configured to transmit these data packets to the computing resource service provider router on the other end of the physical connection.

Accordingly, the authentication request may be delivered to an authentication service operated by the computing resource service provider for processing. The authentication service may be configured to interact with an account service to access the customer account and locate the necessary information to fulfill the request. For example, the authentication service may obtain a cryptographic key from the customer account in order to generate a digital signature which may be used as authentication proof. The authentication service may be configured to generate one or more data packets comprising the information necessary to fulfill the request and transmit these data packets, through the computing resource service provider router to the one or more customer computing systems. In this fashion, the one or more customer computer systems may receive 1004 the authentication proof from the computing resource service provider.

Once the customer computing systems have obtained the authentication proof from the computing resource service provider, the customer computing systems may process the authentication proof to determine 1006 whether the proof is authentic. In order to determine whether the proof is indeed authentic, the customer computing systems may be configured to use a cryptographic key to generate an expected authentication service digital signature and compare this digital signature to the digital signature received from the authentication service. Accordingly, the customer computer systems may locate or generate the expected computing resource service provider credentials (e.g., cryptographic key, expected digital signature, etc.) and compare these credentials to the proof provided. If the authentication proof received does not match the expected computing resource service provider credentials, the customer computer systems may transmit reconfiguration information (e.g., executable instructions) to the customer router to terminate 1008 the connection. Thus, no further transmissions may be received from the computing resource service provider, allowing the customer to address the potential issue.

If the authentication proof received from the computing resource service provider is valid (e.g., the expected authentication service digital signature matches the received digital signature), the customer may allow further transmissions to be made and may continue to access the one or more services provided by the computing resource service provider. Additionally, the customer computer systems may be configured to continue to transmit 1002 one or more authentication requests to the computing resource service provider to ensure that the connection has not been compromised.

Figure 11:
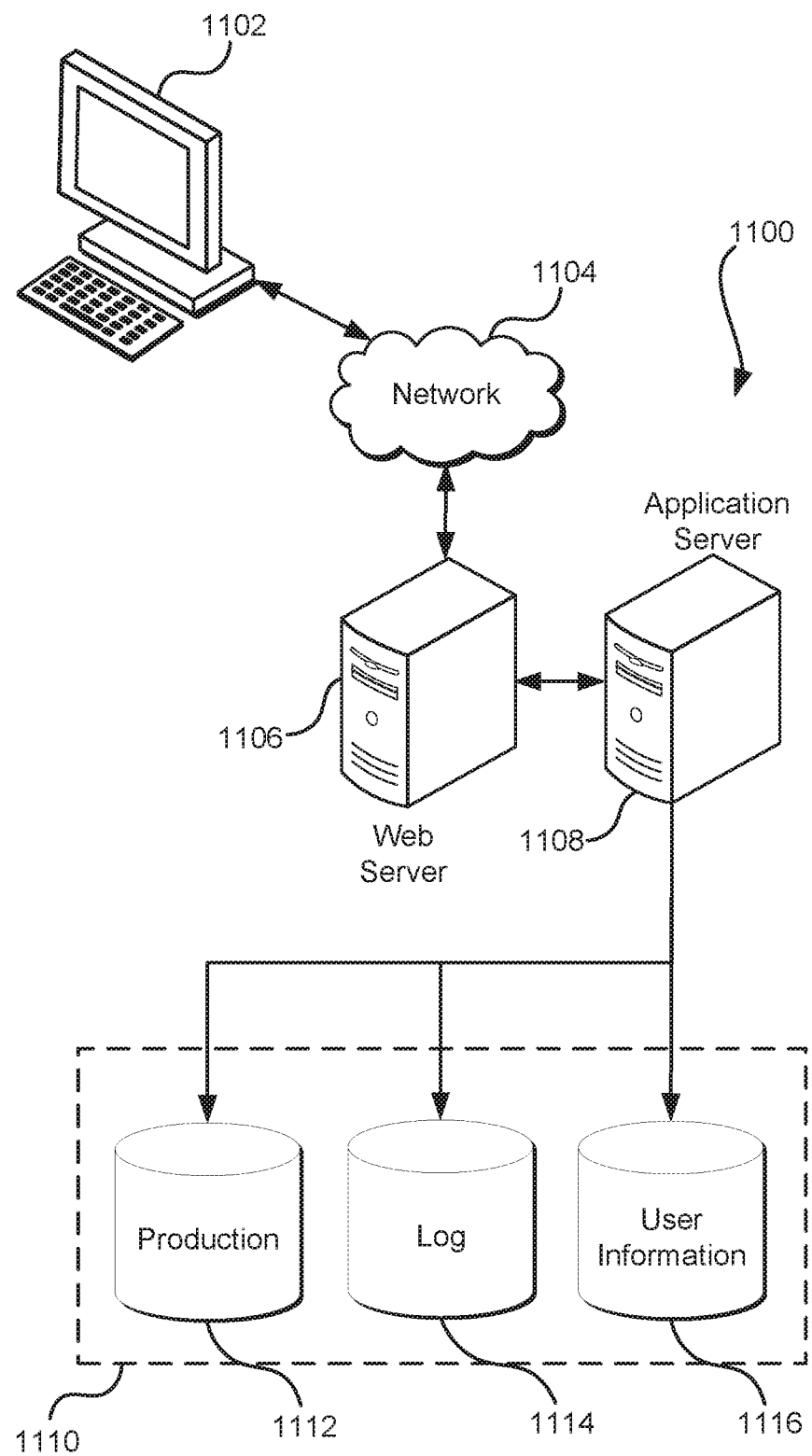
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1110 can include several separate data tables, databases or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
    receiving, at a network device of a computing resource service provider connected to a computer resource service provider network, cryptographic authentication information through a dedicated physical network connection established between the network device and a customer network device that is connected to a customer network separate from the computer resource service provider network;
    obtaining, from an authentication service operable to verify authentication information, verification that the cryptographic authentication information received is authentic based at least in part on a key of a customer associated with the customer network device; and
    as a result of the authentication service successfully verifying the cryptographic authentication information, causing the network device to route network traffic received from the customer network device over the dedicated physical network connection to one or more services of the computing resource service provider different from the authentication service.

2. The computer-implemented method of claim 1, wherein the dedicated physical network connection establishes an exclusive communication channel between the network device of the computing resource service provider and the customer network device, the exclusive communication channel being comprised of one or more physical communication lines.

3. The computer-implemented method of claim 1, wherein the network device of the computing resource service provider is in a colocation center that is remotely located from the customer network device.

4. The computer-implemented method of claim 1, further comprising:
    extracting the key of the customer associated with the customer network device from a customer request to access the computer resource service provider network; and
    generating the cryptographic authentication information based on the extracted key.

5. The computer-implemented method of claim 1, the method further comprising sending a request to provide the cryptographic authentication information over the dedicated physical network connection, wherein the cryptographic authentication information is received after sending the request.

6. The computer-implemented method of claim 1, further comprising:
    detecting that the dedicated physical network connection between the network device and the customer network device has been disconnected;
    determining that a second dedicated physical network connection is established between the network device and a secondary customer network device previously connected with the customer network device; and
    causing the network device to route network traffic received from the secondary customer network device over the second dedicated physical network connection to one or more services of the computing resource service provider based on the cryptographic authentication information.

7. A system comprising:
    one or more processors; and
    memory storing executable instructions that, as a result of execution by the one or more processors, cause the system to:
        establish a dedicated physical network connection between a network device of a computing resource service provider connected to a computer resource service provider network and a customer network device having access denied to the computer resource service provider network;
        receive cryptographic authentication information from the customer network device via the dedicated physical network connection;
        obtain, from an authentication system operable to verify authentication information, verification that the cryptographic authentication information received is authentic based at least in part on a key of a customer associated with the customer network device; and
        cause, as a result of the obtaining successful verification of the cryptographic authentication information, the network device to route network traffic received from the customer network device over the dedicated physical network connection to one or more services of the computing resource service provider different from the authentication system.

8. The system of claim 7, wherein the network traffic is caused to be routed to the one or more services during a first time period, and routing the network traffic received from the customer device during a second time period after the first time period is performed as a result of obtaining verification that second cryptographic information received over the dedicated physical network connection is authentic based at least in part on the key.

9. The system of claim 8, further comprising sending, over the dedicated physical network connection, a request to provide the second cryptographic authentication information, wherein routing the network traffic during the second time period is contingent upon obtaining verification of the second cryptographic information.

10. The system of claim 7, wherein a cryptographically secure communication channel is established over the dedicated physical connection, and the cryptographic authentication information is received through the cryptographically secure communication channel.

11. The system of claim 10, further comprising sending, over the cryptographically secure communication channel, a request to provide the cryptographic authentication information.

12. The system of claim 7, wherein the dedicated physical network connection between the computing resource service provider network device and the customer network device is established in response to generation of an indicia of authority, the indicia of authority generated in response to a request from the customer to establish the dedicated physical network connection.

13. One or more non-transitory computer-readable storage media having collectively stored therein instructions that, when executed by one or more processors of an authentication service, cause the authentication service to:
    make a determination whether cryptographic authentication information generated based at least in part on a key of a customer and received from a customer network device through a dedicated physical network connection with a computing resource service provider network device is authentic, wherein the dedicated physical network connection is established between the computing resource service provider network device connected to a computer resource service provider network and a customer network device that is connected to a customer network separate from the computer resource service provider network; and
    if the determination indicates that the cryptographic authentication information is inauthentic, cause the computing resource service provider network device to deny the network traffic addressed to one or more other services of the computing resource service provider on the computing resource service provider network over the dedicated physical network connection.

14. The one or more non-transitory computer-readable storage media of claim 13, wherein causing the computing resource service provider to deny the network traffic includes transmitting, to the computing resource service provider network device over the dedicated physical network connection, reconfiguration information for denying transmission of the network traffic over the dedicated physical network connection from the customer network device to the one or more other services of the computing resource service provider on the computer resource service provider network.

15. The one or more non-transitory computer-readable storage media of claim 13, wherein the key is a private key from a public-private cryptographic key pair.

16. The one or more non-transitory computer-readable storage media of claim 13, wherein the one or more actions further include provisioning a network interface for the customer on the computing resource service provider network device as a result of the determination indicating that the cryptographic authentication information is authentic.

17. The one or more non-transitory computer-readable storage media of claim 13, wherein the dedicated physical network connection is established based at least in part on a physical connection in a colocation center remote to the customer, the physical connection comprising one or more cables connected from a set of customer network device ports to a set of computing resource service provider network device ports.

18. The one or more non-transitory computer-readable storage media of claim 13, wherein the cryptographic authentication information is transmitted through the dedicated physical network connection in accordance with an authentication protocol used by the customer network device and the computing resource service provider network device.

19. The one or more non-transitory computer-readable storage media of claim 13, wherein the instructions further cause the authentication service to generate second cryptographic authentication information different that the cryptographic authentication information and verifiable by the customer network device to authenticate the computing resource service provider, and transmit the second cryptographic authentication information to the computing resource service provider network device, and cause the computing resource service provider network device to transmit the second cryptographic authentication information to the customer network device.

20. The one or more non-transitory computer-readable storage media of claim 13, wherein the instructions further cause the authentication service to make additional determinations based at least in part on additional cryptographic authentication information received from the customer network device, after authentication of the cryptographic authentication information, one or more times over time.

* * * * *